US008945253B2

(12) United States Patent
Sarangi et al.

(10) Patent No.: US 8,945,253 B2
(45) Date of Patent: Feb. 3, 2015

(54) ABRASIVE ARTICLE FOR ULTRA HIGH MATERIAL REMOVAL RATE GRINDING OPERATIONS

(71) Applicants: Nilanjan Sarangi, Shrewsbury, MA (US); John Campaniello, Oxford, MA (US); James M. Gaffney, Worcester, MA (US); Stephen E. Fox, Worcester, MA (US); John R. Besse, Beacon Falls, CT (US); Stephen Woods, Stafford (GB); Renaud Fix, Paris (FR)

(72) Inventors: Nilanjan Sarangi, Shrewsbury, MA (US); John Campaniello, Oxford, MA (US); James M. Gaffney, Worcester, MA (US); Stephen E. Fox, Worcester, MA (US); John R. Besse, Beacon Falls, CT (US); Stephen Woods, Stafford (GB); Renaud Fix, Paris (FR)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 79 days.

(21) Appl. No.: 13/682,926

(22) Filed: Nov. 21, 2012

(65) Prior Publication Data

US 2013/0152482 A1 Jun. 20, 2013

Related U.S. Application Data

(60) Provisional application No. 61/563,373, filed on Nov. 23, 2011.

(51) Int. Cl.
*B24D 3/14* (2006.01)
*B24D 3/18* (2006.01)
*C09K 3/14* (2006.01)

(52) U.S. Cl.
CPC ................ *B24D 3/18* (2013.01); *C09K 3/1409* (2013.01)
USPC .............................................. 51/309; 51/307

(58) Field of Classification Search
CPC ................................... B24D 3/02; B24D 3/18
See application file for complete search history.

(56) References Cited

U.S. PATENT DOCUMENTS 4,150,514 A 4/1979 Douglass
4,305,898 A 12/1981 Obersby
4,404,003 A 9/1983 Harris
4,541,842 A 9/1985 Rostoker
4,543,107 A 9/1985 Rue
4,898,597 A 2/1990 Hay et al.
4,997,694 A 3/1991 Legare
5,152,810 A 10/1992 Rue et al.
5,203,882 A 4/1993 Carman et al.
5,203,886 A 4/1993 Sheldon et al.
5,302,564 A 4/1994 Winkler et al.
5,318,605 A 6/1994 Carman
5,401,284 A 3/1995 Sheldon et al.
5,536,283 A 7/1996 Sheldon et al.
5,653,775 A 8/1997 Plovnick et al.
5,738,696 A 4/1998 Wu
5,738,697 A 4/1998 Wu et al.
5,858,037 A 1/1999 Sukumaran et al.
5,863,308 A 1/1999 Qi et al.
6,056,794 A 5/2000 Stoetzel et al.
6,123,743 A 9/2000 Carman et al.
6,277,161 B1 8/2001 Castro et al.
6,453,899 B1 9/2002 Tselesin
6,551,366 B1 4/2003 D'Souza et al.
6,562,089 B1 5/2003 Iwai et al.
6,620,214 B2 9/2003 McArdle et al.
6,679,758 B2 1/2004 Bright et al.
6,702,650 B2 3/2004 Adefris
6,702,867 B2 3/2004 Carman et al.
6,805,620 B2 10/2004 Iwai et al.
6,881,483 B2 4/2005 McArdle et al.
6,887,287 B2 5/2005 Li et al.
6,913,824 B2 7/2005 Culler et al.
7,275,980 B2 10/2007 Bonner et al.
7,544,114 B2 6/2009 Orlhac
7,722,691 B2 5/2010 Orlhac et al.
7,935,158 B2 5/2011 Querel et al.
2003/0029094 A1 2/2003 Moeltgen et al.
2003/0194947 A1 10/2003 Bright et al.
2004/0221515 A1 11/2004 McArdle et al.
2005/0026553 A1 2/2005 Bonner et al.
2005/0101225 A1 5/2005 Bright et al.
2006/0160476 A1 7/2006 Bright et al.

(Continued)

FOREIGN PATENT DOCUMENTS

EP 1770145 B1 6/2011
EP 1948398 B1 5/2012
JP 2010274383 A 12/2010

OTHER PUBLICATIONS

International Search Report from PCT/US12/66273 dated Feb. 20, 2013, 1 pg.

(Continued)

*Primary Examiner* — Pegah Parvini
(74) *Attorney, Agent, or Firm* — Abel Law Group, LLP; Joseph P. Sullivan

(57) ABSTRACT

An abrasive article including a bonded abrasive body having a bond material present in an amount of not greater than about 15 vol % for the total volume of the body, abrasive particulate material contained in the bond material, the abrasive particulate material including abrasive agglomerates and unagglomerated abrasive particles, wherein the body comprises an abrasive particulate ratio (APp:APagg) within a range between 3:1 and about 1:3, wherein APp represents the amount (vol %) of unagglomerated abrasive particles present in the body and APagg represents the amount (vol %) of abrasive agglomerates present in the body, and a porosity of at least about 42 vol % of the total volume of the bonded abrasive body.

22 Claims, 5 Drawing Sheets

(56) References Cited

U.S. PATENT DOCUMENTS

2007/0275641 A1* 11/2007 Subramanian et al. ......... 451/57
2008/0066387 A1 3/2008 Bonner et al.
2008/0085660 A1 4/2008 Orlhac
2008/0293345 A1* 11/2008 Bright et al. .................. 451/540
2010/0196700 A1 8/2010 Orlhac et al.
2011/0056142 A1 3/2011 Sheridan
2011/0131889 A1 6/2011 Querel et al.
2011/0183142 A1 7/2011 Gebhardt
2012/0055100 A1 3/2012 Yamazoe et al.

OTHER PUBLICATIONS

International Search Report for PCT/US2012/072239 dated Apr. 25, 2013, 4 pgs.

* cited by examiner

ABRASIVE ARTICLE FOR ULTRA HIGH MATERIAL REMOVAL RATE GRINDING OPERATIONS

CROSS-REFERENCE TO RELATED APPLICATION

The present application claims priority from U.S. Provisional Patent Application No. 61/563,373 entitled "Abrasive Article for Ultra High Material Removal Rate Grinding Operations," by Nilanjan Sarangi, et al., filed Nov. 23, 2011, which is incorporated by reference herein in its entirety.

BACKGROUND

1. Field of the Disclosure

The following is directed to abrasive articles, and particularly bonded abrasive articles suitable for conducting high-speed grinding operations.

2. Description of the Related Art

Abrasive tools are generally formed to have abrasive grains contained within a bond material for material removal applications. Superabrasive grains (e.g., diamond or cubic boron nitride (CBN)) or seeded (or even unseeded) sintered sol gel alumina abrasive grain, also referred to microcrystalline alpha-alumina (MCA) abrasive grain, can be employed in such abrasive tools. The bond material can be organic materials, such as a resin, or an inorganic material, such as a glass or vitrified material. In particular, bonded abrasive tools using a vitrified bond material and containing MCA grains or superabrasive grain are commercially useful for grinding.

Certain bonded abrasive tools, particularly those utilizing a vitrified bond material, require high temperature forming processes, oftentimes on the order of 1100° C. or greater, which can have deleterious effects on abrasive grains of MCA. In fact, it has been recognized that at such elevated temperatures necessary to form the abrasive tool, the bond material can react with the abrasive grains, particularly MCA grains, and damage the integrity of the abrasives, reducing the grain sharpness and performance properties. As a result, the industry has migrated toward reducing the formation temperatures necessary to form the bond material in order to curb the high temperature degradation of the abrasive grains during the forming process.

For example, to reduce the amount of reaction between MCA grain and vitrified bond, U.S. Pat. No. 4,543,107 discloses a bond composition suitable for firing at a temperature as low as about 900° C. In an alternate approach, U.S. Pat. No. 4,898,597 discloses a bond composition comprising at least 40% fritted materials suitable for firing at a temperature as low as about 900° C. Other such bonded abrasive articles utilizing bond materials capable of forming at temperatures below 1000° C., include U.S. Pat. No. 5,203,886, U.S. Pat. No. 5,401,284, U.S. Pat. No. 5,536,283, and U.S. Pat. No. 6,702,867. Still, the industry continues to demand improved performance of such bonded abrasive articles.

The above vitreous bond materials are not necessarily suitable for high-speed grinding operations. Typically, high-speed grinding operations require vitreous bonded abrasive articles formed at sintering temperatures in excess of 1100° C., such that the abrasive article can withstand the forces applied during high-speed grinding operations. The industry continues to demand improved bonded abrasive articles.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
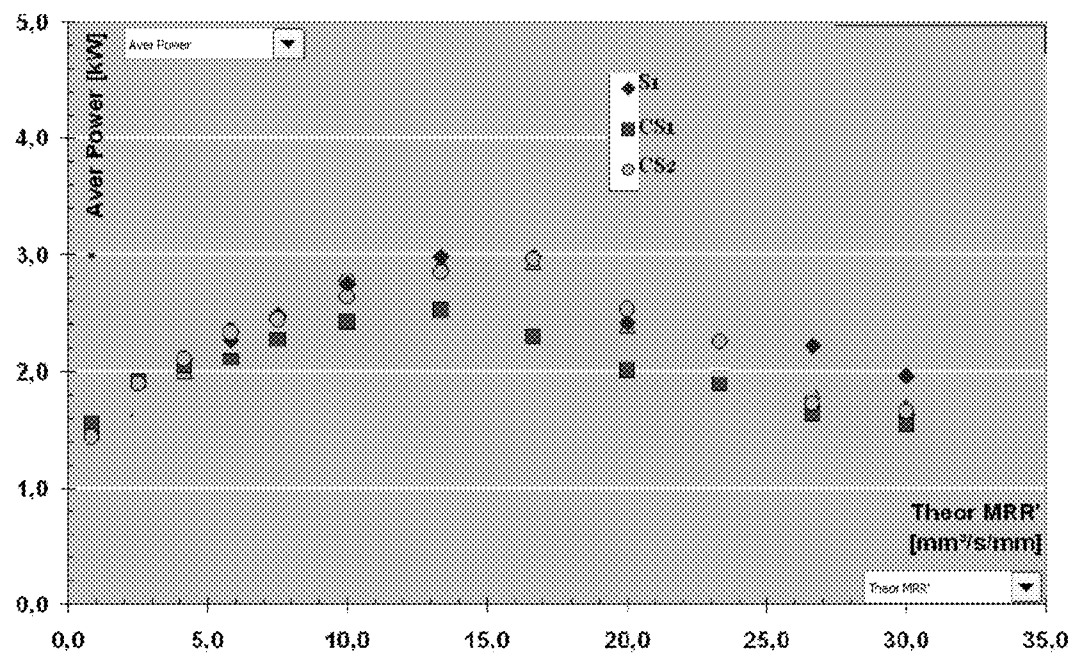
FIG. 1 includes a plot of average power (kW) versus material removal rate (mm3/s/mm) for conventional bonded abrasive articles and an abrasive article according to an embodiment.

The following is directed to bonded abrasive articles, which may be suitable for grinding and shaping of workpieces. Notably, the bonded abrasive articles of embodiments herein can incorporate abrasive particles within a bond material. Suitable applications for use of the bonded abrasive articles of the embodiments herein include grinding operations including for example, centerless grinding, cylindrical grinding, crankshaft grinding, various surface grinding operations, bearing and gear grinding operations, creepfeed grinding, and various toolroom applications.

According to an embodiment, the method of forming a bonded abrasive article of an embodiment can be initiated by forming a mixture of suitable compounds and components to form a bond material. The bond can be formed of compounds of inorganic material, such as oxide compounds. For example, one suitable oxide material can include silicon oxide ($SiO_2$). In accordance with an embodiment, the bond material can be formed from not greater than about 62 wt % silicon oxide for the total weight of the bond material. In other embodiments, the content of silicon oxide can be less, such as not greater than about 60 wt %, not greater than about 59 wt %, or even not greater than about 58 wt %. Still, in certain embodiments the bond material may be formed from at least about 45 wt %, on the order of at least about 47 wt %, at least about 48 wt %, or even at least about 49 wt %, at least about 50 wt %, at least about 52 wt % silicon oxide for the total weight of the bond material. It will be appreciated that the amount of silicon oxide can be within a range between any of the minimum and maximum percentages noted above.

The bond material can also incorporate a certain content of aluminum oxide ($Al_2O_3$). For example, the bond material can include at least about 9 wt % aluminum oxide for the total weight of the bond material. In other embodiments, the amount of aluminum oxide can be at least about 10 wt %, at least about 11 wt %, or even about 12 wt %. In certain instances, the bond material may include an amount of aluminum oxide that is not greater than about 20 wt %, not greater than about 18 wt %, not greater than about 16 wt %, or even not greater than about 15 wt % for the total weight of the bond. It will be appreciated that the amount of aluminum oxide can be within a range between any of the minimum and maximum percentages noted above.

In certain instances, the bond material can be formed from a particular ratio between the amount of silicon oxide as measured in weight percent versus the amount of aluminum oxide as measured in weight percent. For example, the ratio of silica to alumina can be described by dividing the weight percent of silicon oxide by the weight percent of aluminum oxide within the bond material. In accordance with an embodiment, the ratio of silicon oxide to aluminum oxide can be not greater than about 5. In other instances, the ratio of silicon oxide to aluminum oxide within the bond material can be not greater than about 4.8, not greater than about 4.6, not greater than about 4.5. Still, the bond material can be formed such that the ratio of weight percent of silicon oxide to the weight percent of aluminum oxide is at least about 1.8, such as at least about 2, such as at least about 2.2, or even at least about 2.5. It will be appreciated that the total amount of aluminum oxide and silicon oxide can be within a range between any of the minimum and maximum values noted above.

In accordance with an embodiment, the bond material can be formed form a certain content of boron oxide ($B_2O_3$). For example, the bond material can incorporate not greater than about 20 wt % boron oxide for the total weight of the bond material. In other instances, the amount of boron oxide can be less, such as not greater than about 19 wt %, not greater than about 18 wt %, not greater than about 17 wt %, or even not greater than about 16 wt %. Still, the bond material can be formed from at least about 10 wt %, such as at least about 12 wt %, at least about 13 wt %, or even at least about 14 wt % boron oxide for the total weight of the bond material. It will be appreciated that the amount of boron oxide can be within a range between any of the minimum and maximum percentages noted above.

In accordance with one embodiment, the bond material can be formed such that the total content (i.e. sum) of the weight percent of boron oxide and weight percent of silicon oxide within the bond material can be not greater than about 80 wt % for the total weight of the bond material. In other instances, the total content of silicon oxide and boron oxide can be not greater than about 78 wt %, such as not greater than about 76 wt %, or even not greater than about 74 wt %. In accordance with one particular embodiment, the total weight percent content of silicon oxide and boron oxide can be at least about 60 wt %, such as at least about 66 wt %, at least about 68 wt %, or even at least about 70 wt % for the total weight of the bond material. It will be appreciated that the total weight percent of silicon oxide and boron oxide within the bond material can be within a range between any of the minimum and maximum percentages noted above.

Moreover, in particular instances, the amount of silicon oxide can be greater than the amount of boron oxide within the bond material, as measured in weight percent. Notably, the amount of silicon oxide can be at least about 1.5 times greater, at least about 1.7 times greater, at least about 1.8 times greater, at least about 1.9 times greater, at least about 2.0 times greater, or even at least about 2.5 times greater than the amount of boron oxide. Still, in one embodiment, the bond material can include an amount of silicon oxide that is not greater than about 5 times greater, such as not more than about 4.5 times greater, or even not more than about 4 times greater than the amount of boron oxide. It will be appreciated that the difference in the amount of silicon oxide as compared to the amount of boron oxide can be within a range between any of the minimum and maximum values noted above.

In accordance with an embodiment, the bond material can be formed from at least one alkali oxide compound ($R_2O$), wherein R represents a metal selected from Group IA elements in the Periodic Table of Elements. For example, the bond material can be formed from an alkaline oxide compound ($R_2O$) from the group of compounds including lithium oxide ($Li_2O$), sodium oxide ($Na_2O$), potassium oxide ($K_2O$), and cesium oxide ($Cs_2O$), and a combination thereof.

In accordance with an embodiment, the bond material can be formed from a total content of alkali oxide compounds of not greater than about 20 wt % for the total weight of the bond material. For other bonded abrasive articles according to embodiments herein, the total content of alkali oxide compounds can be not greater than about 19 wt %, not greater than about 18 wt %, not greater than about 17 wt %, not greater than about 16 wt %, or even not greater than about 15 wt %. Still, in one embodiment, the total content of alkali oxide compounds within the bond material can be at least about 5 wt %, such as at least about 7 wt %, at least about 9 wt %, at least about 11 wt %, or even at least about 12 wt %. It will be appreciated that the bond material can include a total content of alkali oxide compounds within a range between any of the minimum and maximum percentages noted above.

In accordance with one particular embodiment, the bond material can be formed from not greater than about 4 individual alkali oxide compounds ($R_2O$) as noted above. In fact, certain bond materials may incorporate not greater than about 3 alkali oxide compounds within the bond material. In one particular embodiment, the bond material can be formed from at least 2 alkali oxide compounds.

In accordance with one particular embodiment, the amount of sodium oxide can be greater than the content (weight percent) of lithium oxide or potassium oxide. In more particular instances, the total content of sodium oxide as measured in weight percent can be greater than the sum of the contents of lithium oxide and potassium oxide as measured in weight percent. Furthermore, in one embodiment, the amount of lithium oxide can be greater than the content of potassium oxide.

In accordance with one embodiment, the total amount of alkali oxide compounds as measured in weight percent forming the bond material can be less than the amount (as measured in weight percent) of boron oxide within the bond material. In fact, in certain instances the total weight percent of alkali oxide compounds as compared to the total weight percent of boron oxide ($R_2O/B_2O_3$) within the bond material can be within a range between about 0.7 to about 1.5, such as within a range between about 0.7 and about 1.3, or even within a range between about 0.7 and about 1.1.

The bond material can be formed from a certain amount of alkali earth compounds (RO), wherein R represents an element from Group IIA of the Periodic Table of Elements. For example, the bond material can incorporate alkaline earth oxide compounds such as calcium oxide (CaO), magnesium oxide (MgO), barium oxide (BaO), or even strontium oxide (SrO).

In accordance with an embodiment, the bond material can be formed from not greater than about 3 wt % alkaline earth oxide compounds for the total weight of the bond material. In still other instances, the bond material may be formed from less alkaline earth oxide compounds, such as on the order of not greater than about 2.8 wt %, not greater than about 2.2 wt %, not greater than about 2 wt %, not greater than about 1.8 wt %, not greater than about 1.3 wt %, or even not greater than about 1 wt %. Still, according to one embodiment, the bond material may contain a content of one or more alkaline earth oxide compounds of at least about 0.2 wt %, such as at least about 0.3 wt %, at least about 0.5 wt %, or even at least about 0.6 wt % for the total weight of the bond material. It will be appreciated that the amount of alkaline earth oxide compounds within the bond material can be within a range between any of the minimum and maximum percentages noted above.

In accordance with an embodiment, the bond material can be formed from not greater than about 3 different alkaline earth oxide compounds. In fact, the bond material may contain not greater than 2 different alkaline earth oxide compounds, or even not greater than about 1 alkaline earth oxide compound.

In one embodiment, the bond material can include an amount of calcium oxide that is greater than an amount of magnesium oxide. Furthermore, the amount of calcium oxide within the bond material may be greater than the content of any of the other alkaline earth oxide compound present within the bond material.

The bond material can be formed from a combination of alkali oxide compounds ($R_2O$) and alkaline earth oxide compounds (RO) such that the total content is not greater than about 20 wt % for the total weight of the bond material. In other embodiments, the total content of alkali oxide compounds and alkaline earth oxide compounds within the bond material can be not greater than about 19 wt %, such as not greater than about 18 wt %, or even not greater than about 17 wt %. However, in certain embodiments, the total content of alkali oxide compounds and alkaline earth compounds present within the bond material can be at least about 7 wt %, such as at least about 8 wt %, such as at least about 10 wt %, at least about 11 wt %, or even at least about 12 wt %. It will be appreciated that the bond material can have a total content of alkali oxide compounds and alkaline earth compounds within a range between any of the minimum and maximum percentages noted above.

In accordance with an embodiment, the bond material can be formed such that the total content of alkali oxide compounds present within the bond material is greater than the total content of alkaline earth oxide compounds. In one particular embodiment, the bond material may be formed such that the ratio of total content (in weight percent) of alkali oxide compounds as compared to the total weight percent of alkaline earth oxide compounds ($R_2O$:RO) is within a range between about 5:1 and about 18:1. In other embodiments, the ratio of total weight percent of alkali oxide compounds to total weight percent of alkaline earth oxide compounds present within the bond material can be within a range between about 6:1 and about 17:1, such as within a range between about 7:1 and about 17:1, or even with a range between about 8:1 and about 17:1.

In accordance with an embodiment, the bond material can be formed from not greater than about 3 wt % phosphorous oxide for the total weight of the bond material. In certain other instances, the bond material may contain not greater than about 2.5 wt %, such as not greater than about 2 wt %, not greater than about 1.5 wt %, not greater than about 1 wt %, not greater than about 0.8 wt %, not greater than about 0.5 wt %, or even not greater than about 0.2 wt % phosphorous oxide for the total weight of the bond material. In fact, in certain instances, the bond material may be essentially free of phosphorous oxide. Suitable contents of phosphorous oxide can facilitate certain characteristics and grinding performance properties as described herein.

In accordance with one embodiment, the bond material can be formed from a composition comprising not greater than about 1 wt % of certain oxide compounds, including for example, oxide compounds such as $MnO_2$, $ZrSiO_2$, $CoAl_2O_4$, and MgO. In fact, in particular embodiments, the bond material can be essentially free of any oxide compounds including $MnO_2$, $ZrSiO_2$, $CoAl_2O_4$, and MgO.

In addition to the bond materials placed within the mixture, the process of forming the bonded abrasive article can further include the incorporation of a certain abrasive particulate material. In certain instances, the mixture use to form the abrasive article can include a combination of different types of abrasive particulate material, including for example, a combination of unagglomerated abrasive particles and abrasive agglomerates. The unagglomerated abrasive particles can be distinct and separate particulate material from the abrasive agglomerates. The unagglomerated abrasive particles can be individual abrasive particles defining a crystalline or polycrystalline material. The abrasive agglomerates can be an aggregate of abrasive particles bonded together and contained within a binder.

The unagglomerated abrasive particles can include an oxide, carbide, nitride, boride, and a combination thereof. The abrasive particles can be a superabrasive material. One exemplary oxide material suitable for use in the unagglomerated abrasive particles is alumina. According to a particular embodiment, the unagglomerated abrasive particles can consist essentially of alumina, and more particularly, consist essentially of microcrystalline alumina. The unagglomerated abrasive particles may contain the same material as the abrasive particles contained in the abrasive agglomerates.

The unagglomerated abrasive particles can have an average particle size that is not greater than about 1050 microns. In other embodiments, the average particle size of the unagglomerated abrasive particles can be less, such as on the order of not greater than 800 microns, not greater than about 600 microns, not greater than about 400 microns, not greater than about 250 microns, not greater than about 225 microns, not greater than about 200 microns, not greater than about 175 microns, not greater than about 150 microns, or even not greater than about 100 microns. Still, the average particle size of the unagglomerated abrasive particles can be at least about 1 micron, such as at least 5 microns, at least about 10 microns, at least about 20 microns, at least about 30 microns, or even at least about 50 microns, at least about 60 microns, at least about 70 microns, or even at least about 80 microns. It will be appreciated that the average particle size of the unagglomerated abrasive particles can be in a range between any of the minimum and maximum values noted above.

In further reference to the unagglomerated abrasive particles utilizing microcrystalline alumina, it will be appreciated that microcrystalline alumina can be formed of grains (i.e., crystallite) having an average grain size that is submicron sized. In fact, the average grain size of microcrystalline alumina can be not greater than about 1 micron, such as not greater than about 0.5 microns, not greater than about 0.2 microns, not greater than about 0.1 microns, or even not greater than about 0.08 microns. Still, in one instance, the average grain size can be at least about 0.01 microns.

In reference to the abrasive agglomerates, the unagglomerated abrasive particles can be combined with abrasive agglomerates to form the abrasive article. The abrasive agglomerates comprise abrasive particles contained in a binder. The abrasive particles of the abrasive agglomerates can be an oxide, carbide, nitride, boride, and a combination thereof. The abrasive particles of the abrasive agglomerates can be a superabrasive material. In one instance, the abrasive particles of the abrasive agglomerates can include alumina, and may consist essentially of alumina, and more particularly, can consist essentially of microcrystalline alumina.

According to one particular embodiment, the abrasive agglomerates can be made by forming a mixture including a binder material and abrasive particles. Depending upon the binder material, the mixture can be treated to form the abrasive agglomerates. For example, for a binder material comprising an inorganic material, such as an oxide-based material (e.g., vitreous material), further treating of the mixture can include heat treating, and particularly treatment in a rotary kiln to create the abrasive agglomerates. After treating, the resulting material can be comminuted as necessary to achieve a particular size and shape of abrasive agglomerate.

In an exemplary and non-limiting embodiment, the abrasive agglomerates can contain not greater than about 80 vol % abrasive particles of for the total volume of the abrasive agglomerate. In other instances, the abrasive agglomerates can be formed to contain not greater than about 70 vol %, not greater than about 65 vol %, not greater than about 60 vol %, not greater than about 55 vol %, or even not greater than about 50 vol % abrasive particles for the total volume of the abrasive agglomerates. Still, in particular instances, the abrasive agglomerates can be formed to include at least about 10 vol %, such as at least about 20 vol %, at least about 25 vol %, or even at least about 30 vol % abrasive particles for the total volume of the abrasive agglomerates. It will be appreciated that content of abrasive particles within the abrasive agglomerates can be within a range between any of the minimum and maximum values noted above.

Moreover, in one embodiment, the abrasive particles of the abrasive agglomerates can have an average particle size of at least about 10 microns. In still other agglomerates of the embodiments herein, the average particle size of the abrasive particles can be at least about 20 microns, such as at least about 50 microns. Still, the abrasive particles can be not greater than about 250 microns, not greater than about 200 microns, or even not greater than about 180 microns. It will be appreciated that average particle size of the abrasive particles within the abrasive agglomerates can be within a range between any of the minimum and maximum values noted above.

The abrasive particles of the abrasive agglomerate can include microcrystalline alumina that can have an average grain size as described in embodiments herein.

The abrasive agglomerates can have a particular size. For example, the abrasive agglomerates can have an average agglomerate size, which is a measure of the longest dimension of the agglomerate, of at least about 50 microns, such at least about 80 microns, at least about 100 microns, at least about 150 microns, at least about 200 microns, at least about 250 microns, at least about 500 microns, or at least about 600 microns. Still, according to one particular embodiment, the abrasive agglomerates can have an average agglomerate size not greater than about 2 mm, such as not greater than about 1 mm, or even not greater than about 0.8 mm. It will be appreciated that average agglomerate size can be within a range between any of the minimum and maximum values noted above.

As described herein, the abrasive agglomerates can have abrasive particles contained in a binder. According to one non-limiting embodiment, the binder can be an inorganic material, an organic material, and a combination thereof. Some exemplary binders include vitrified material, organic material, crystalline material, and a combination thereof. In one particular instance, the binder can be an oxide-based vitrified material having a particular composition facilitating formation of an abrasive article according to embodiments herein.

According to an embodiment, the binder can be formed from silicon oxide ($SiO_2$), and in particular, may contain not greater than about 62 wt % silicon oxide for the total weight of the binder. In other embodiments, the binder can be formed from a silicon oxide content of not greater than about 60 wt %, not greater than about 59 wt %, or even not greater than about 58 wt %. Still, in certain embodiments the binder may be formed from at least about 45 wt %, such as at least about 50 wt %, or even at least about 52 wt % silicon oxide for the total weight of the binder. It will be appreciated that the amount of silicon oxide can be within a range between any of the minimum and maximum percentages noted above.

The binder can also incorporate a certain content of aluminum oxide ($Al_2O_3$), such as at least about 9 wt %, at least about 10 wt %, or even about 12 wt % for the total weight of the binder. In certain instances, the binder may include an amount of aluminum oxide that is not greater than about 20 wt %, not greater than about 16 wt %, or even not greater than about 14 wt % aluminum oxide. It will be appreciated that the amount of aluminum oxide can be within a range between any of the minimum and maximum percentages noted above.

In certain instances, the binder can be formed from a particular ratio between the amount of silicon oxide as measured in weight percent versus the amount of aluminum oxide as measured in weight percent. For example, the ratio of silica to alumina can be described by dividing the weight percent of silicon oxide by the weight percent of aluminum oxide within the bond material. In accordance with an embodiment, the ratio of silicon oxide to aluminum oxide can be not greater than about 5 or not greater than about 4.5. Still, the binder can be formed such that the ratio of weight percent of silicon oxide to the weight percent of aluminum oxide is at least about 1.8, such as at least about 2.2, or even at least about 2.5. It will be appreciated that the total amount of aluminum oxide and silicon oxide can be within a range between any of the minimum and maximum values noted above.

In accordance with an embodiment, the binder can be formed form a certain content of boron oxide ($B_2O_3$). For example, the binder can be formed from not greater than about 20 wt % boron oxide, such as not greater than about 18 wt % for the total weight of the binder. Still, the binder can be formed from at least about 10 wt % or even at least about 12 wt % boron oxide for the total weight of the binder. It will be appreciated that the amount of boron oxide can be within a range between any of the minimum and maximum percentages noted above.

In accordance with one embodiment, the binder can be formed such that the total content (i.e. sum) of the weight percent of boron oxide and weight percent of silicon oxide within the bond material can be not greater than about 80 wt % for the total weight of the binder. In other instances, the total content of silicon oxide and boron oxide can be not greater than about 78 wt %, such as not greater than about 76 wt %. In accordance with one particular embodiment, the total weight percent content of silicon oxide and boron oxide can be at least about 55 wt %, such as at least about 58 wt %, or even at least about 62 wt % for the total weight of the binder. It will be appreciated that the total weight percent of silicon oxide and boron oxide within the binder can be within a range between any of the minimum and maximum percentages noted above.

Moreover, in particular instances, the amount of silicon oxide can be greater than the amount of boron oxide within the binder, as measured in weight percent. Notably, the amount of silicon oxide can be at least about 1.5 times greater, at least about 1.7 times greater, at least about 1.8 times greater, or even at least about 2.5 times greater than the amount of boron oxide. Still, in one embodiment, the binder can include an amount of silicon oxide that is less than about 5 times greater, such as not more than about 4.5 times greater, or even not more than about 4 times greater than the amount of boron oxide. It will be appreciated that the difference in the amount of silicon oxide as compared to the amount of boron oxide can be within a range between any of the minimum and maximum values noted above.

In accordance with an embodiment, the binder can be formed from at least one alkali oxide compound ($R_2O$), wherein R represents a metal selected from Group IA elements in the Periodic Table of Elements. For example, the binder can be formed from an alkaline oxide compound ($R_2O$) from the group of compounds including lithium oxide ($Li_2O$), sodium oxide ($Na_2O$), potassium oxide ($K_2O$), and cesium oxide ($Cs_2O$), and a combination thereof.

In accordance with an embodiment, the binder can be formed from a total content of alkali oxide compounds of not greater than about 20 wt % for the total weight of the binder. For other agglomerates according to embodiments herein, the total content of alkali oxide compounds can be not greater than about 19 wt %, not greater than about 18 wt %, not greater than about 17 wt %, not greater than about 16 wt %, or even not greater than about 15 wt %. Still, in one embodiment, the total content of alkali oxide compounds within the binder of the agglomerates can be at least about 5 wt %, such as at least about 7 wt %, or even at least about 9 wt %. It will be appreciated that the binder can include a total content of alkali oxide compounds within a range between any of the minimum and maximum percentages noted above.

In accordance with one particular embodiment, the binder can be formed from not greater than about 4 individual alkali oxide compounds ($R_2O$) as noted above. In fact, certain binders may use not greater than about 3 alkali oxide compounds, such as 2 alkali oxide compounds.

In accordance with one particular embodiment, the amount of sodium oxide present in the binder of the agglomerates can be greater than the content (weight percent) of lithium oxide or potassium oxide. In more particular instances, the total content of sodium oxide as measured in weight percent can be greater than the sum of the contents of lithium oxide and potassium oxide as measured in weight percent. Furthermore, in one embodiment, the amount of lithium oxide can be greater than the content of potassium oxide.

In accordance with one embodiment, the total amount of alkali oxide compounds as measured in weight percent forming the binder can be less than the amount (as measured in weight percent) of boron oxide within the binder. In fact, in certain instances the total weight percent of alkali oxide compounds as compared to the total weight percent of boron oxide ($R_2O/B_2O_3$) within the binder can be within a range between about 0.7 to about 1.5, such as within a range between about 0.7 and about 1.3, or even within a range between about 0.7 and about 1.1.

The binder of the abrasive agglomerates can be formed from a certain amount of alkali earth compounds (RO), wherein R represents an element from Group IIA of the Periodic Table of Elements. For example, the binder can incorporate alkaline earth oxide compounds such as calcium oxide (CaO), magnesium oxide (MgO), barium oxide (BaO), or even strontium oxide (SrO).

In accordance with an embodiment, the binder can be formed from not greater than about 3 wt % alkaline earth oxide compounds for the total weight of the binder. In still other instances, the binder may be formed from less alkaline earth oxide compounds, such as on the order of not greater than about 2.8 wt %, not greater than about 2.2 wt %, not greater than about 2 wt %, not greater than about 1.8 wt %, not greater than about 1.3 wt %, or even not greater than about 1 wt %. Still, according to one embodiment, the binder may contain a total content of one or more alkaline earth oxide compounds of at least about 0.2 wt % or even at least about 0.6 wt % for the total weight of the binder. It will be appreciated that the amount of alkaline earth oxide compounds within the binder can be within a range between any of the minimum and maximum percentages noted above.

In accordance with an embodiment, the binder of the abrasive agglomerates can be formed from not greater than about 3 different alkaline earth oxide compounds, such as not greater than 2 different alkaline earth oxide compounds, or even not greater than 1 alkaline earth oxide compound.

In one embodiment, the binder can include an amount of calcium oxide that is greater than an amount of magnesium oxide. Furthermore, the amount of calcium oxide within the bond material may be greater than the content of any of the other alkaline earth oxide compound present within the binder.

The binder can be formed from a combination of alkali oxide compounds ($R_2O$) and alkaline earth oxide compounds (RO) such that the total content is not greater than about 20 wt % for the total weight of the binder. In other embodiments, the total content of alkali oxide compounds and alkaline earth oxide compounds within the binder can be not greater than about 19 wt %, such as not greater than about 18 wt %, or even not greater than about 17 wt %. However, in certain embodiments, the total content of alkali oxide compounds and alkaline earth compounds present within the bond material can be at least about 7 wt %, such as at least about 8 wt %, such as at least about 9 wt %, or even at least about 10 wt %. It will be appreciated that the bond material can have a total content of alkali oxide compounds and alkaline earth compounds within a range between any of the minimum and maximum percentages noted above.

In accordance with an embodiment, the binder of the abrasive agglomerates can be formed such that the total content of alkali oxide compounds present within the bond material is greater than the total content of alkaline earth oxide compounds. In one particular embodiment, the binder may be formed such that the ratio of total content (in weight percent) of alkali oxide compounds as compared to the total weight percent of alkaline earth oxide compounds ($R_2O$:RO) is within a range between about 5:1 and about 25:1. In other embodiments, the ratio of total weight percent of alkali oxide compounds to total weight percent of alkaline earth oxide compounds present within the binder can be within a range between about 6:1 and about 23:1, such as within a range between about 7:1 and about 22:1, or even with a range between about 8:1 and about 20:1.

In accordance with an embodiment, the binder can be formed from not greater than about 3 wt % phosphorous oxide for the total weight of the binder. In certain other instances, the binder may contain not greater than about 2.5 wt %, such as not greater than about 2 wt %, not greater than about 1.5 wt %, not greater than about 1 wt %, not greater than about 0.8 wt %, not greater than about 0.5 wt %, or even not greater than about 0.2 wt % phosphorous oxide for the total weight of the binder. In fact, in certain instances, the binder may be essentially free of phosphorous oxide. Suitable contents of phosphorous oxide can facilitate certain characteristics and grinding performance properties as described herein.

The abrasive agglomerates can contain a particular amount of binder to facilitate the formation of a bonded abrasive body according to the embodiments herein. For example, the amount of binder can be not greater than about 20 vol % for the total volume of the abrasive agglomerate. In still other instances, the amount of binder can be not greater than about 18 vol %, not greater than about 15 vol %, not greater than about 12 vol %, not greater than about 10 vol %, not greater than about 8 vol %, not greater than about 5 vol %, not greater than about 4 vol %, or even not greater than about 3 vol %. Still, according to one particular embodiment, the abrasive agglomerates can be formed to include at least about 0.5 vol %, at least about 0.8 vol %, at least about 1 vol %, or even at least about 1.3 vol % binder for the total volume of the abrasive agglomerate. It will be appreciated that amount of binder within the abrasive agglomerates can be within a range between any of the minimum and maximum percentages noted above.

The abrasive agglomerates can contain a particular amount of porosity to facilitate the formation of a bonded abrasive body according to the embodiments herein. For example, the amount of porosity within the abrasive agglomerates can be at least about 15 vol % for the total volume of the abrasive agglomerate. In another embodiment, the amount of porosity can be at least about 18 vol %, at least about 20 vol %, at least about 25 vol %, at least about 30 vol %, at least about 40 vol %, at least about 45 vol %, at least about 50 vol %, at least about 55 vol %, or even at least about 57 vol %. Still, according to particular embodiments the porosity of the abrasive agglomerates can be not greater than about 85 vol %, not greater than about 80 vol %, not greater than about 75 vol %, or even not greater than about 70 vol % for the entire volume of the abrasive agglomerates.

The abrasive agglomerates may be formed to have a particular shape. For example, certain abrasive agglomerates can have an aspect ratio, which is a measure of the length (i.e., longest dimension) to the width (shortest dimension measured perpendicular to the length) of not greater than about 3:1. In other instances, the aspect ratio of the abrasive agglomerates can be not greater than about 2:1, not greater than about 1.7:1, not greater than about 1.5:1, or even not greater than about 1.3:1. In one particular embodiment, the abrasive article includes abrasive agglomerates that are substantially equiaxed particles.

Additionally, the bonded abrasive body can be formed from a mixture including an additive, including form example, one or more inorganic materials, including for example oxides, and particularly may include crystalline or amorphous phases of zirconia, silica, titania, and a combination thereof.

In certain instances, the additive can include one or more pore forming agents. Some suitable pore forming agents can include organic materials, natural materials, polymer materials, inorganic materials, and a combination thereof. According to one embodiment, the body can be formed from one or more pore forming agents such as bubble alumina, bubble mullite, hollow glass spheres, hollow ceramic spheres, hollow polymer spheres, polymers, organic compounds, fibrous materials, naphthalene, para-dichlorobenzene (PDB), shells, wood, and a combination thereof. In more particular instances, the bonded abrasive body can be formed from a combination of at least about 2 different pore forming agents, wherein the body is formed from a combination of bubble material and an organic-based pore forming agent. The organic-based pore forming agent can be walnut shell.

In certain embodiments, the bonded abrasive body can be formed from a pore forming agent in an amount of at least about 1 wt % for the total weight of the mixture. In other instances, the content of pore forming agent making up the mixture from which the bonded abrasive body is formed can be at least about 2 wt %, such as at least about 3 wt %, at least about 4 wt %, or even at least about 5 wt %. Still, the total content of the pore forming agent used to form the bonded abrasive body can be not greater than about 15 wt %, not greater than about 12 wt %, not greater than about 10 wt %, not greater than about 9 wt % for the total weight of the mixture. It will be appreciated that the amounts above may represent the amount of bubble alumina within the mixture used to form the bonded abrasive body. It will be further appreciated that the total content of the pore forming agent within the mixture to form the bonded abrasive body can be within a range between any of the minimum and maximum percentages noted above.

After the mixture is suitably formed, the mixture can be shaped. Suitable shaping processes can include casting, molding, pressing, extrusion, and a combination thereof. In particular instances, shaping includes pressing operations and/or molding operations and a combination thereof. For example, in one embodiment, the mixture can be shaped by cold pressing the mixture within a mold to form a green body.

After suitably forming the green body, the green body can be fired at a particular temperature to facilitate forming an abrasive article having a suitable bond material. Notably, for embodiments herein utilizing a vitreous phase bond material, the firing operation can be conducted at a firing temperature that is less than about 1000° C. In particular embodiments, the firing temperature can be less than about 980° C., such as less than about 950° C., and particularly within a range between about 800° C. and 950° C. It will be appreciated that particularly low firing temperatures may be utilized with the above-noted bond components such that excessively high temperatures are avoided and thus limiting the degradation of the abrasive particles during the forming process.

According to one particular embodiment, the bonded abrasive body comprises a bond material having a vitreous phase material. In particular instances, the bond material can be a single phase vitreous material.

The finally-formed bonded abrasive body can have a particular content of bond material, abrasive particles, and porosity that may facilitate improved performance. For example, the body of the bonded abrasive article can have a porosity of at least about 42 vol % for the total volume of the bonded abrasive body. In other embodiments, the amount of porosity can be greater such as at least about 43 vol %, such as at least about 44 vol %, at least about 45 vol %, at least about 46 vol %, at least about 48 vol %, at least about 50 vol %, or even at least about 52 vol %, for the total volume of the bonded abrasive body. In accordance with an embodiment the bonded abrasive body can have a porosity that is not greater than about 70 vol %, such as not greater than about 65 vol %, not greater than about 63 vol %, not greater than about 60 vol %, not greater than about 58 vol % for the total volume of the bonded abrasive body. It will be appreciated that the bonded abrasive body can have a porosity within a range between any of the minimum and maximum percentages noted above.

Furthermore, in particular instances, the bonded abrasive body can have a portion of the porosity that is interconnected porosity, wherein interconnected porosity is defined as an interconnected network of channels extending through the body and open to the external surface of the bonded abrasive body. According to one embodiment, at least about 5% of the total volume of porosity is interconnected porosity. In other instances, the content of interconnected porosity can be greater, such as at least about 10%, at least about 20%, at least about 30%, at least about 40%, or even at least about 50% of the total porosity. Still, in particular embodiments, the amount of interconnected porosity may be not greater than about 95%, such as not greater than about 90%, or not greater than about 85% of the total volume of porosity. It will be appreciated that the bonded abrasive body can have a content of interconnected porosity within a range between any of the minimum and maximum percentages noted above.

In an embodiment, the bonded abrasive body can contain a minor content (vol %) of bond material as compared to the content of porosity and abrasive particles. For example, the bonded abrasive body can have not greater than about 15 vol % bond material for the total volume of the bonded abrasive body. In other instances, the bonded abrasive body can be formed such that it contains not greater than about 12 vol %, not greater than about 10 vol %, or even not greater than about 9 vol %, not greater than about 8 vol %, not greater than about 7 vol %, or even not greater than about 6.5 vol % bond material for the total volume of the bonded abrasive body. In one particular instance, the bonded abrasive body can have at least about 1 vol %, such as at least about 2 vol %, on the order of at least about 3 vol %, or even at least about 4 vol % bond material for the total volume of the bonded abrasive body. It will be appreciated that the bonded abrasive body can have a content of bond material within a range between any of the minimum and maximum percentages noted above.

The bonded abrasive body can contain a particular content of abrasive particulate material that may facilitate improved performance. The abrasive particulate material can include unagglomerated abrasive particles, abrasive agglomerates, and secondary abrasive materials and fillers.

In accordance with an embodiment, the bonded abrasive body can have a total content of abrasive particulate material of at least about 35 vol % for the total volume of the bonded abrasive body. In certain other instances, the total content of abrasive particulate material can be greater, such as at least about 37 vol %, at least about 39 vol %, at least about 40 vol %, at least about 42 vol %, or even at least about 44 vol %. In accordance with another particular embodiment, the bonded abrasive body can be formed such that it has not greater than about 55 vol %, not greater than about 54 vol %, not greater than about 52 vol %, not greater than about 50 vol %, not greater than about 48 vol %, or even not greater than about 46 vol % abrasive particulate material for the total volume of the bonded abrasive body. It will be appreciated that the content of abrasive particulate material within the bonded abrasive body can be within a range between any of the minimum and maximum percentages noted above.

In one particular instance, the content (vol %) of abrasive agglomerates can be greater than a content (vol %) of unagglomerated abrasive particles. For example, the body may be formed entirely of abrasive agglomerates and contain no unagglomerated abrasive particles. Alternatively, the amount (vol %) of abrasive agglomerates can be less than a content (vol %) of unagglomerated abrasive particles. Still, in another particular embodiment, the amount (vol %) of abrasive agglomerates can be substantially equal to (within 5%) the content (vol %) of unagglomerated abrasive particles.

In certain exemplary bonded abrasive bodies, the amount of abrasive agglomerates and unagglomerated abrasive particles can be described by an abrasive particulate ratio ($AP_p$:$AP_{agg}$) within a range between 3:1 and about 1:3, wherein $AP_p$ represents an amount (vol %) of abrasive particles present in the body and $AP_{agg}$ represents an amount (vol %) of abrasive agglomerates present in the body. In other instances, the abrasive particulate ratio ($AP_p$:$AP_{agg}$) can be within a range between about 2.8:1 and about 1:2.8, such as within a range between about 2.6:1 and about 1:2.6, within a range between about 2.4:1 and about 1:2.4, within a range between about 2.2:1 and about 1:2.2, within a range between about 2:1 and about 1:2, within a range between about 1.8:1 and about 1:1.8, within a range between about 1.6:1 and about 1:1.6, or even within a range between about 1.4:1 and about 1:1.4.

According to a particular embodiment, the body can have a content of abrasive agglomerates of at least about 10 vol % for the total volume of the body. Still, the content of abrasive agglomerates may be greater, such as at least about 15 vol %, at least about 20 vol %, at least about 25 vol %, at least about 30 vol %, or even at least about 32 vol % for the total volume of the body. However, in one particular instance, the abrasive agglomerates can be present in an amount of not greater than about 80 vol %, such as not greater than about 70 vol %, not greater than about 65 vol %, not greater than about 60 vol %, not greater than about 55 vol %, not greater than about 50 vol %, not greater than about 45 vol %, or even not greater than about 42 vol %. It will be appreciated that the content of abrasive agglomerates within the bonded abrasive body can be within a range between any of the minimum and maximum percentages noted above.

In one embodiment, the body can have a content of unagglomerated abrasive particles of at least about 10 vol % for the total volume of the body. Still, the content of unagglomerated abrasive particles may be greater, such as at least about 15 vol %, at least about 20 vol %, at least about 25 vol %, at least about 30 vol %, or even at least about 32 vol % for the total volume of the body. However, in one particular instance, the unagglomerated abrasive particles can be present in an amount of not greater than about 80 vol %, such as not greater than about 70 vol %, not greater than about 65 vol %, not greater than about 60 vol %, not greater than about 55 vol %, not greater than about 50 vol %, not greater than about 45 vol %, or even not greater than about 42 vol %. It will be appreciated that the content of unagglomerated abrasive particles within the bonded abrasive body can be within a range between any of the minimum and maximum percentages noted above.

It will be reasonably understood that the total content of the component phases (e.g., abrasive particulate material, porosity, bond, fillers, etc.) of the bonded abrasive body add up to, and do not exceed, 100%.

Generally, the phase contents of conventional bonded abrasive articles is limited, typically have a maximum porosity within a range between approximately 40 vol % and 51 vol %, an abrasive particle content of between approximately 42 vol % to 50 vol %, and a bond content of between approximately 10 to 20 vol %. Conventional bonded abrasive articles typically have a maximum porosity content of 50 vol % or less because the grinding applications require a bonded abrasive body having sufficient strength to deal with the excessive forces encountered during high-speed grinding, and highly porous bonded abrasive bodies have not previously been able to withstand said forces.

High-speed grinding applications are typically considered conducted at operating speeds of 60 m/s or greater. As used herein, ultra high material removal rate (UHMRR) grinding operations are grinding operations conducted at a material removal rate of at least about 1.6 in.$^3$/min./in. [17.3 mm$^3$/s/mm] without evidence of damage (e.g., burn) to the workpiece. Other grinding parameters used in UHMRR grinding operations will be apparent based on the disclosure.

The bonded abrasive bodies of the embodiments herein can have particular characteristics unlike conventional high-speed bonded abrasive articles. In particular, the bonded abrasive articles herein can have a particular combination of phases facilitating improved performance, particularly in the realm of UHMRR grinding operations.

Reference herein to the grinding capabilities of the bonded abrasive body can relate to grinding operations such as centerless grinding, cylindrical grinding, crankshaft grinding, various surface grinding operations, bearing and gear grinding operations, creepfeed grinding, and various toolroom grinding processes. Moreover, suitable workpieces for the grinding operations can include inorganic or organic materials. In particular instances, the workpiece can include a metal, metal alloy, plastic, or natural material. In one embodiment, the workpiece can include a ferrous metal, non-ferrous metal, metal alloy, metal superalloy, and a combination thereof. In another embodiment, the workpiece can include an organic material, including for example, a polymer material. In still other instances, the workpiece may be a natural material, including for example, wood.

In particular instances, it has been noted that the bonded abrasive body is capable of grinding workpieces at ultra high material removal rates. For example, in one embodiment, the bonded abrasive body can conduct a grinding operation at a material removal rate of at least about at least about 1.60 in.$^3$/min./in. [17.3 mm$^3$/s/mm], such as 1.7 in.$^3$/min./in. [18.4 mm$^3$/s/mm], at least about 1.8 in.$^3$/min./in. [19.4 mm$^3$/s/mm], at least about 1.9 in.$^3$/min./in. [20.5 mm$^3$/s/mm], or even at least 2.0 in.$^3$/min./in. [21.6 mm$^3$/s/mm]. operation. Still, the material removal rate for certain bonded abrasive bodies may be not greater than about not greater about 5.0 in.$^3$/min./in. [54 mm$^3$/s/mm], such as not greater than about 4.5 in.$^3$/min./in. [48.6 mm$^3$/s/mm] during an ultra-high material removal rate (UHMRR) grinding operation. It will be appreciated that the bonded abrasive bodies of the present application can grind a workpiece at the material removal rates within a range between any of the minimum and maximum values noted above.

It has been noted that the bonded abrasive body is capable of grinding workpieces at ultra high material removal rates and having limited wear. For example, in one embodiment, the bonded abrasive body can have a relative wear rate of not greater than about 90% wherein relative wear rate is calculated as the change in radius of the wheel after conducting an UHMRR grinding operation according to an embodiment. In other embodiments, the relative wear rate of the bonded abrasive body can be less, such as not greater than about 85%, not greater than about 80%, not greater than about 70%, not greater than about 60%, or not greater than about 40% during an UHMRR grinding operation. Still, in one particular instance, the bonded abrasive bodies herein can have a relative wear rate of at least about 5%, or even at least about 10% during an UHMRR grinding operation. It will be appreciated that the bonded abrasive bodies of the present application can have a wear rate within a range between any of the minimum and maximum percentages noted above.

Additionally, the bonded abrasive body can be capable of grinding workpieces at ultra high material removal rates and having a specific grinding energy. For example, in one embodiment, the bonded abrasive body can have a specific grinding energy, measured as the slope of a curve of power versus material removal rate, of not greater than about 11 Hp/in$^3$ min (30 J/mm$^3$) during an ultra-high material removal rate (UHMRR) grinding operation. In still other instances, the bonded abrasive articles of the embodiments herein can have a specific grinding energy of not greater than about 10.9 Hp/in$^3$ min (29.4 J/mm$^3$), not greater than about 10.8 Hp/in$^3$ min (29.1 J/mm$^3$), or even not greater than about 10.7 Hp/in$^3$ min (28.8 J/mm$^3$) during an ultra-high material removal rate (UHMRR) grinding operation. Still, according to one embodiment, the specific grinding energy may be at least about 5 Hp/in$^3$ min (13.5 J/mm$^3$), or even at least about 7 Hp/in$^3$ min (18.9 J/mm$^3$) during an ultra-high material removal rate (UHMRR) grinding operation. It will be appreciated that the bonded abrasive bodies of the present application can have a specific grinding energy during UHMRR grinding operations within a range between any of the minimum and maximum values noted above.

Moreover, the bonded abrasive body can be configured to conduct ultra high material removal rate grinding operations with improved efficiency. For example, in one embodiment, the bonded abrasive body can have a specific threshold power, which is a measure (or extrapolation) of the power utilized at a material removal rate of 0, based on the slope of a curve from the power versus material removal rate plot. According to one embodiment, the specific threshold power can be not greater than about 1.2 Hp/in, such as not greater than about 1.1 Hp/in, not greater than about 1.0 Hp/in, or even not greater than about 0.9 Hp/in. Still, according to one embodiment, the specific threshold power may be at least about 0.1 Hp/in, or even not greater than about 0.3 Hp/in. It will be appreciated that the bonded abrasive bodies of the present application can have a specific threshold power within a range between any of the minimum and maximum values noted above.

During certain grinding operations, it has been noted that the bonded abrasive bodies of the present application can conduct a UHMRR grinding operation at a particular average depth of cut (DOC). For example, the depth of cut achieved by the bonded abrasive body can be at least about 0.003 inches (0.0762 mm). In other instances, the bonded abrasive body is capable of achieving a depth of cut during high-speed grinding operations of at least about 0.007 inches (0.117 mm), such as at least about 0.01 inches (0.254 mm), or even at least about 0.015 inches (0.381 mm). Still, the average depth of cut for certain UHMRR grinding operations utilizing the bonded abrasive bodies herein may not be greater than about 0.05 inches (1.27 mm), or not great than about 0.03 inches (0.762 mm). It will be appreciated that the average depth of cut can be within a range between any of the minimum and maximum values noted above.

In other embodiments, it has been noted that the bonded abrasive body can grind a workpiece at a maximum power that does not exceed about 10 Hp (7.5 kW) during UHMRR grinding operations. In other embodiments, the maximum power during high-speed grinding operations may be not greater than about 9 Hp (6.8 kW), such as not greater than about 8 Hp (6.0 kW), or even not greater than about 7.5 Hp (5.6 kW).

The bonded abrasive bodies of the embodiments herein can be used in an UHMRR grinding operation at a speed of not greater 55 m/s. In other instances, the speed of operation of the bonded abrasive body during an UHMRR grinding operation can be greater, such as not greater than about 50 m/s, not greater than about 45 m/s, or not greater than about 40 m/s. In certain instances, the bonded abrasive body may be capable of grinding a workpiece in an UHMRR grinding operation at a speed of at least about 5 m/s, such as at least about 10 m/s, at least about 20 m/s, or even at least about 30 m/s. It will be appreciated that the bonded abrasive bodies of the embodiments herein can conduct an UHMRR grinding operation on a workpiece at a speed within a range between any of the minimum and maximum values noted above.

The bonded abrasive bodies of the embodiments herein can be configured to conduct an UHMRR grinding operation have a G-ratio, which is a measure of the material removed from the workpiece divided by the volume of material lost form the workpiece, of at least about 0.1, such as at least about 0.13, at least about 0.16, or even at least about 0.2.

Reference herein to the grinding capabilities of the bonded abrasive body can relate to grinding operations such as centerless grinding, cylindrical grinding, crankshaft grinding, various surface grinding operations, bearing and gear grinding operations, creepfeed grinding, and various toolroom grinding processes. Moreover, suitable workpieces for the grinding operations can include inorganic or organic materials. In particular instances, the workpiece can include a metal, metal alloy, plastic, or natural material. In one embodiment, the workpiece can include a ferrous metal, non-ferrous metal, metal alloy, metal superalloy, and a combination thereof. In another embodiment, the workpiece can include an organic material, including for example, a polymer material. In still other instances, the workpiece may be a natural material, including for example, wood.

It will be appreciated that various types of unagglomerated abrasive particles may be utilized in the present embodiments. For example, the bonded abrasive body can include an unagglomerated abrasive particle including an abrasive material including a carbide, an oxide, a nitride, a boride, an oxycarbide, an oxynitride, and a combination thereof. In one particular instance, the bonded abrasive body can include unagglomerated abrasive particles including silicon carbide. The unagglomerated abrasive particles may be superabrasive material, such as cubic boron nitride or diamond.

According to another embodiment, the unagglomerated abrasive particles can be shaped abrasive particles. Shaped abrasive particles can have a well-defined and regular arrangement (i.e., non-random) of edges and sides, thus defining an identifiable shape. For example, a shaped abrasive particle may have a polygonal shape as viewed in a plane defined by any two dimensions of length, width, and height. Some exemplary polygonal shapes can be triangular, quadrilateral (e.g., rectangular, square, trapezoidal, parallelogram), a pentagon, a hexagon, a heptagon, an octagon, a nonagon, a decagon, and the like. Additionally, the shaped abrasive particle can have a three-dimensional shape defined by a polyhedral shape, such as a prismatic shape or the like. Further, the shaped abrasive particles may have curved edges and/or surfaces, such that the shaped abrasive particles can have convex, concave, ellipsoidal shapes.

The shaped abrasive particles can be in the form of any alphanumeric character, e.g., 1, 2, 3, etc., A, B, C. etc. Further, the shaped abrasive particles can be in the form of a character selected from the Greek alphabet, the modern Latin alphabet, the ancient Latin alphabet, the Russian alphabet, any other alphabet (e.g., Kanji characters), and any combination thereof.

The shaped abrasive particle can have a body defining a length (l), a height (h), and a width (w), wherein the length is greater than or equal to the height, and the height is greater than or equal to the width. Further, in a particular aspect, the body may include a primary aspect ratio defined by the ratio of length:height of at least about 1:1. The body may also include an upright orientation probability of at least about 50%.

In another aspect, the shaped abrasive particle can have a body having a length (l), a width (w), and a height (h), wherein the length, width, and height may correspond to a longitudinal axis, a lateral axis, and a vertical axis, respectively, and the longitudinal axis, lateral axis, and vertical axis may define three perpendicular planes. In this aspect, the body may include an asymmetric geometry with respect to any of the three perpendicular planes.

In yet another aspect, the shaped abrasive particle may include a body having a complex three-dimensional geometry including 3-fold symmetry in three perpendicular planes defined by a longitudinal axis, a lateral axis, and a vertical axis. Further, the body may include an opening that extends through the entire interior of the body along one of the longitudinal axis, lateral axis, or vertical axis.

In still another aspect, the shaped abrasive particle may include a body having a complex three-dimensional geometry defined by a length (l), a width (w), and a height (h). The body may also include a center of mass and a geometric midpoint. The center of mass may be displaced from the geometric midpoint by a distance (Dh) of at least about 0.05 (h) along a vertical axis of the body defining the height.

In another aspect, the shaped abrasive particle may include a body that defines a length (l), a width (w), and a height (h). The body may include a base surface and an upper surface. Further, the base surface comprises a different cross-sectional shape than a cross-sectional shape of the upper surface.

In still another aspect, the shaped abrasive particle may include a body that has a generally flat bottom and a dome shaped top extending from the generally flat bottom.

In another aspect, the shaped abrasive particle may include a body comprising a length (l), a width (w), and a height (h). The length, width, and height may correspond to a longitudinal axis, a lateral axis, and a vertical axis, respectively. Further, the body may include a twist along a longitudinal axis defining the length of the body such that a base surface is rotated with respect to an upper surface to establish a twist angle.

In yet another aspect, the shaped abrasive particle may include a body having a first end face and a second end face a, at least three adjacent side faces extending between the first end face and the second end face, and an edge structure established between each pair of adjacent side faces.

In another aspect, the shaped abrasive particle may include a body having a central portion and at least three radial arms extending outwardly from the central portion along the entire length of the central portion.

EXAMPLES

Example 1

Four samples of bonded abrasive bodies are obtained. Sample S1 is formed according to embodiments herein, having porosity of approximately 52 vol % to approximately 58 vol %, an abrasive particulate material content within a range between 34 vol % and 40 vol % including a content of abrasive agglomerates between 34 vol % and 40 vol % and a content of unagglomerated abrasive particles of microcrystalline alumina between about 0 vol % and about 5 vol %. The abrasive agglomerates contain approximately 70 vol % to 90 vol % abrasive particles of alumina, 1 vol % to 4 vol % binder, and the remainder is porosity. The vitreous binder composition of the abrasive agglomerates is provided in Table 1 below. The bonded abrasive body of Sample S1 has a content of vitreous bond material between about 3 vol % to 8 vol %. The composition of the bond material is provided in Table 2 below. Sample S1 further includes a content of bubble alumina within a range between about 4 vol % to 6 vol %.

Sample S1 is formed from a mixture that is initially cold pressed to form wheels and fired at a temperature of approximately 900° C. to 1250° C. having a vitreous bond material.

TABLE 1

| Vitreous Binder Composition of Abrasive Agglomerates | | | | | | | | | |
|---|---|---|---|---|---|---|---|---|---|
| Oxide | SiO2 | Al2O3 | Fe2O3 | TiO2 | CaO | Na2O | K2O | Li2O | B2O3 |
| Weight % | 52-58 | 12-14 | <1 | <1 | <1 | 7.5-10 | <1 | 2-3 | 12-18 |

TABLE 2

| Vitreous Bond Composition of Bonded Abrasive Wheel | |
|---|---|
| SiO2 | 48-52 |
| Al2O3 | 15-20 |
| Fe2O3 | Trace (<1.0%) |
| TiO2 | Trace |
| CaO | 1-1.5 |
| MgO | Trace |
| Li2O | 2-5 |
| Na2O | 5-10 |
| K2O | 2-5 |
| B2O3 | 10-17 |

Two conventional Samples CS1 and CS2 are obtained from Saint-Gobain Abrasives, Inc. and are commercially available as Vortex Bonded Abrasive Wheels [Structures D28, D29, respectively]. Samples CS1 and CS2 have the same structure as Sample S1, including approximately 52 vol % to 58 vol % porosity, an abrasive agglomerate content between 34 vol % and 40 vol %, and a vitreous bond content of between about 3 vol % to 8 vol %. The abrasive agglomerates contain approximately 70 vol % to 90 vol % abrasive particles of alumina, 1 vol % to 4 vol % binder, and the remainder is porosity. The vitreous binder composition of the abrasive agglomerates is provided in Table 3 below. The composition of the bond material is provided in Table 4 below. Samples CS1 and CS2 have no bubble alumina material or unagglomerated abrasive particles.

TABLE 3

| Binder Composition of Agglomerates of Sample CS2 | | | | | | | | | |
|---|---|---|---|---|---|---|---|---|---|
| Oxide | SiO2 | Al2O3 | Fe2O3 | TiO2 | CaO | Na2O | K2O | Li2O | B2O3 |
| Weight % | 52-58 | 12-14 | <1 | <1 | <1 | 7.5-10 | <1 | 2-3 | 12-18 |

TABLE 4

| Bond Composition of Sample CS2 | | | | | | | | | |
|---|---|---|---|---|---|---|---|---|---|
| Oxide | SiO2 | Al2O3 | Fe2O3 | TiO2 | CaO | Na2O | K2O | Li2O | B2O3 |
| Weight % | 52-58 | 12-14 | <1 | <1 | <1 | 7.5-10 | <1 | 2-3 | 12-18 |

Each of the samples is used in an UHMRR creepfeed grinding test according to the following parameters. The table speed was varied between 100, 300, 500, 700, 900, 1200, 1600, 2000, 2400, 2800, 3200 and 3600 mm/min. The average depth of cut was 0.5 mm, and for a fixed depth of cut, the table speed was increased progressively. The width of the slots formed is fixed at 10 mm. The material removal rate was varied between 0.83 to 30 $mm^3/s/mm$ on a workpiece of Inconel. The wheel speed was approximately 35 m/s. A coolant of emulsion 3% (Oel-Held) was also used.

The abrasive bodies were dressed according to the following conditions.

| Dressing Conditions: | |
|---|---|
| Type: | Rotary Dresser |
| Roll Specification: | Norton RPC 1312-2 #11 |
| Dressing Set-up: | Non-Continuous Dress |
| Diameter (in): | 3.5 |
| Dress Comp (μin/pass): | 20.0 |
| Dresser Speed ratio | 0.8 |

FIG. 1 includes a plot of average power (kW) versus material removal rate ($mm^3/s/mm$). As illustrated, the power drawn for each of the samples (S1, CS1, and CS2) is relatively the same.

Figure 2:
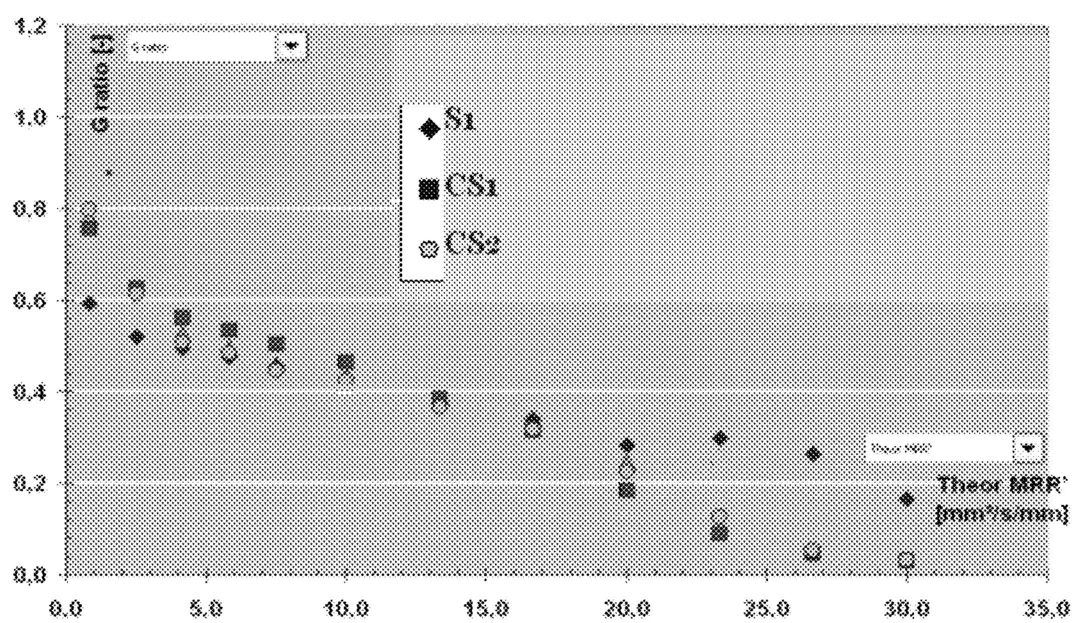
FIG. 2 includes a plot of G-ratio (volume of material removed/volume of wheel wear) versus material removal rate ($mm^3$/s/mm) for conventional bonded abrasive articles and an abrasive article according to an embodiment.

FIG. 2 is a plot of G-ratio (volume of material removed/volume of wheel wear) versus material removal rate ($mm^3/s/mm$). Notably, at high material removal rates, particularly those exceeding 20 $mm^3/s/mm$, Sample S1 demonstrates improved G-ratio as compared to the conventional samples. In fact, for example, at a material removal rate of approximately 23 $mm^3/s/mm$, Samples CS1 and CS2 have a G-ratio of approximately 0.1, while the Sample S1 has a G-ratio of approximately 0.28 respectively. The percentage difference in G-ratio between the Sample S1 and conventional Samples CS1 and CS2 is over a 100% difference. Sample S1 has a G-ratio that is at least 2 times better, and nearly 3 times better than the conventional samples (CS1 and CS2) at high material removal rates.

Figure 3:
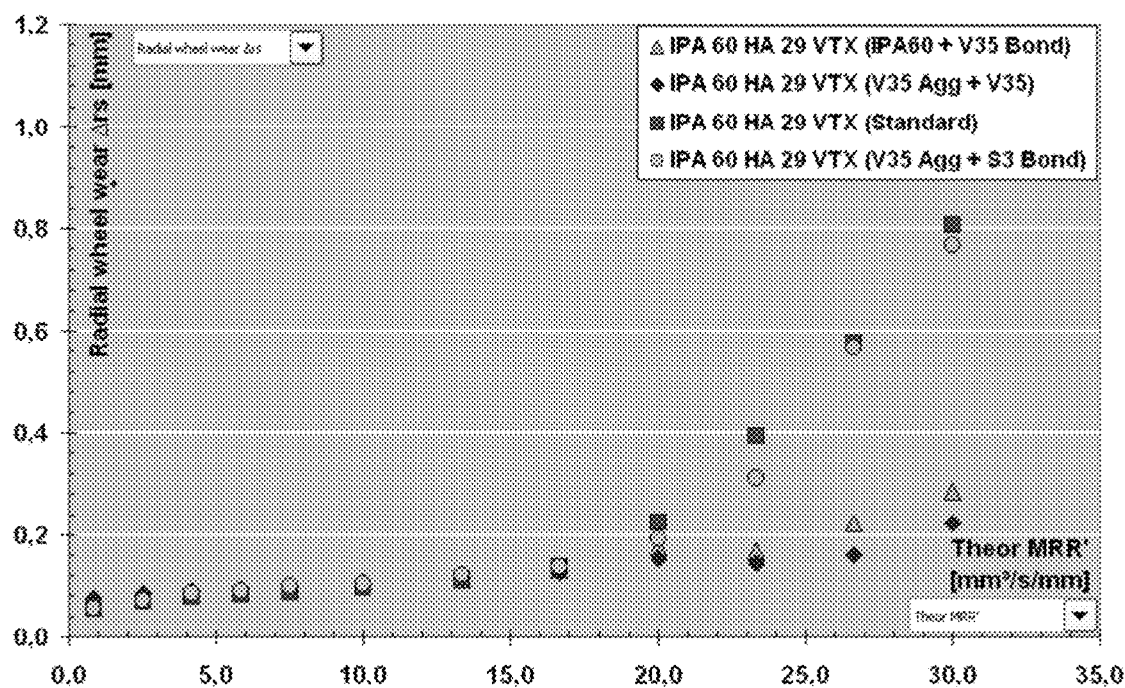
FIG. 3 includes a plot of radial wheel wear (Δrs in mm) versus material removal rate ($mm^3$/s/mm) for conventional bonded abrasive articles and an abrasive article according to an embodiment.

FIG. 3 is a plot of radial wheel wear (Ars in mm) versus material removal rate ($mm^3/s/mm$). Notably, at high material removal rates, particularly those exceeding 20 $mm^3/s/mm$, Sample S1 demonstrates remarkably limited wheel wear as compared to the state-of-the-art wheels CS1 and CS2. Notably, as illustrated, at a material removal rate of approximately 23 $mm^3/s/mm$, Samples CS1 and CS2 have a wear of nearly three times the wear of Sample S1. At a material removal rate of approximately 27 $mm^3/s/mm$, Samples CS1 and CS2 have a wear of nearly three time the wear of Sample S1. And, at a material removal rate of approximately 30 $mm^3/s/mm$, Samples CS1 and CS2 have a wear rate of nearly triple the wear of Sample S1. Sample S1 demonstrates limited wear at ultra high material removal rates as compared to the conventional samples (CS1 and CS2).

Figure 4:
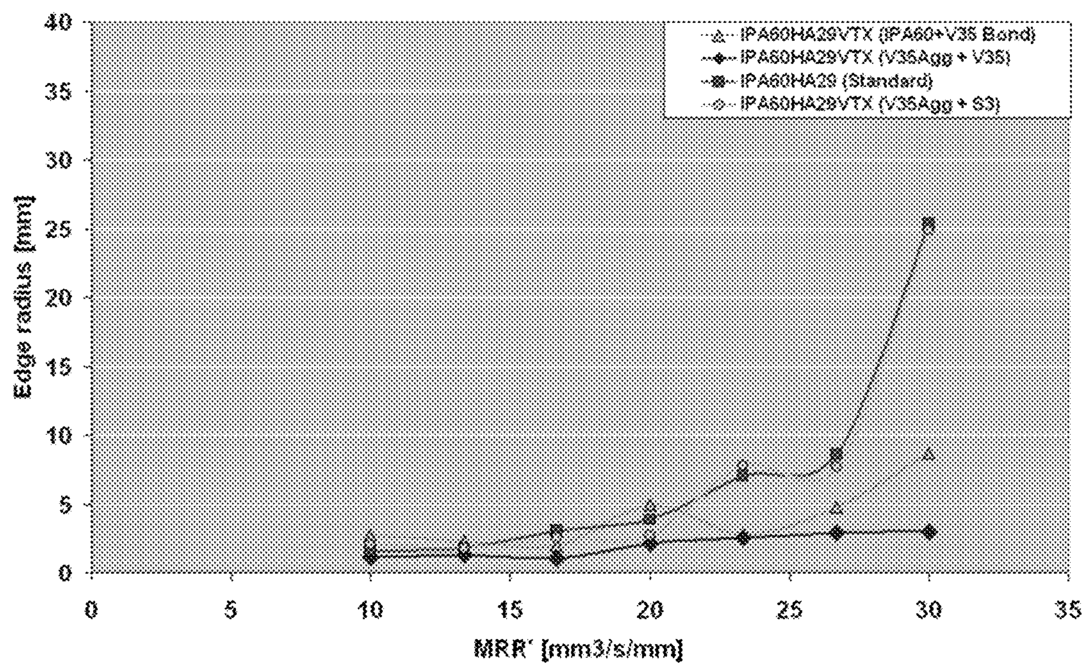
FIG. 4 includes a plot of edge radius (mm) versus material removal rate ($mm^3$/s/mm) for conventional bonded abrasive articles and an abrasive article according to an embodiment.

FIG. 4 is a plot of edge radius (mm) versus material removal rate ($mm^3/s/mm$). Edge radius is a measure of the rounding of the edge of the grinding wheel, which is measured via optical comparator. Notably, at high material removal rates, particularly those exceeding 20 $mm^3/s/mm$, Sample S1 demonstrates unexpectedly low corner rounding (low edge radius) as compared to the wheels CS1 and CS2. Notably, as illustrated in FIG. 4, at a material removal rate of approximately 23 $mm^3/s/mm$. Samples CS1 and CS2 have an edge radius nearly two times the radius of the Sample S1. Furthermore, at higher material removal rates of approximately 27 $mm^3/s/mm$ and 30 $mm^3/s/mm$, the smoothing of the corners of the Samples CS1 and CS2 is increased dramatically, while the rounding of the corners of the Sample S1 is limited, and in all instances, less than half of the measured radius for Samples CS1 and CS2. Sample S1 demonstrates improved corner holding at ultra high material removal rates as compared to the conventional samples (CS1 and CS2).

Figure 5:
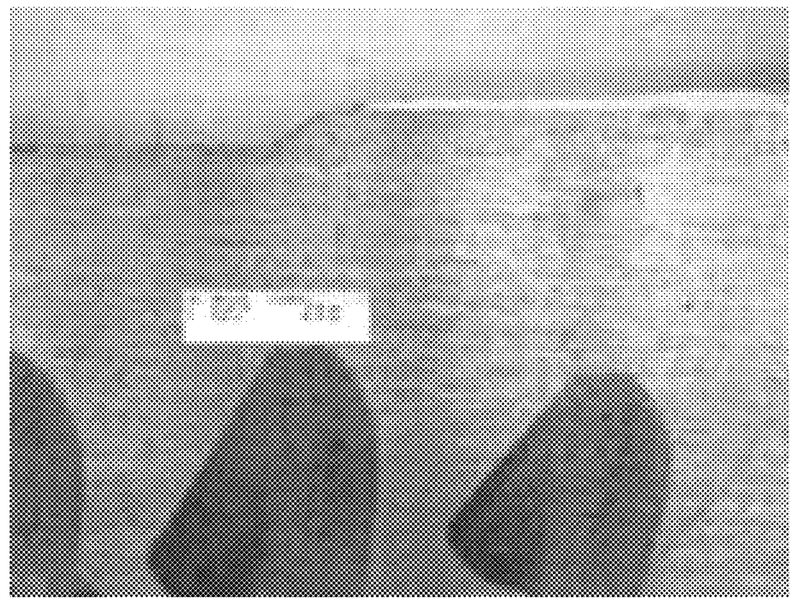
FIGS. 5 and 6 include illustrations of loss of form between conventional bonded abrasives and an abrasive article according to an embodiment.
Figure 6:
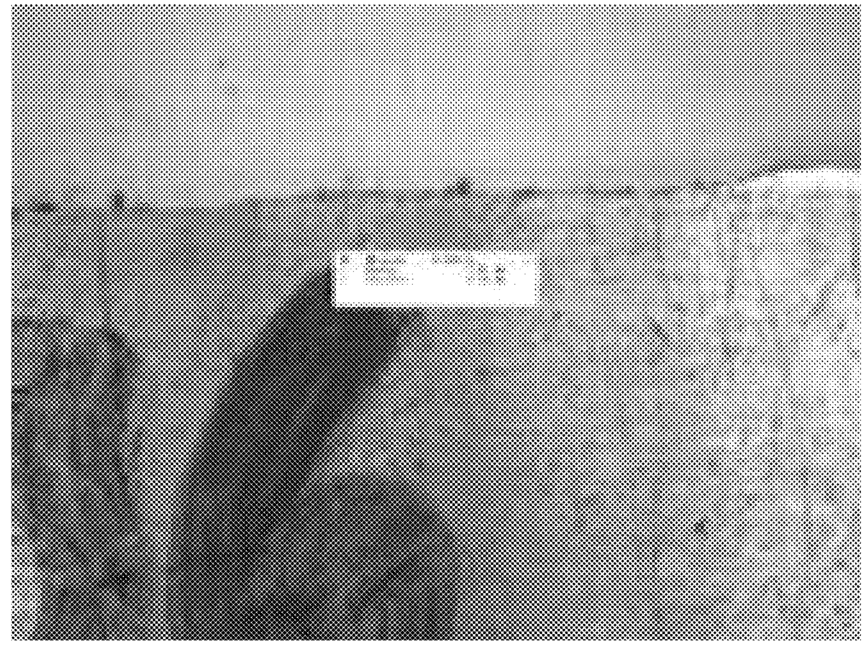

FIGS. 5 and 6 are illustrations of loss of form between a conventional sample representative of Sample CS1 or CS2 and a sample according to embodiments herein, representative of Sample S1. As clearly illustrated, after conducting a UHMRR grinding procedure according to the conditions as in previous example, the sample representative of the embodiments herein (S1) has limited wear (See, FIG. 6). However, the conventional sample, which is illustrated in FIG. 5, is significantly gouged and demonstrates significant loss of form.

Figure 7:
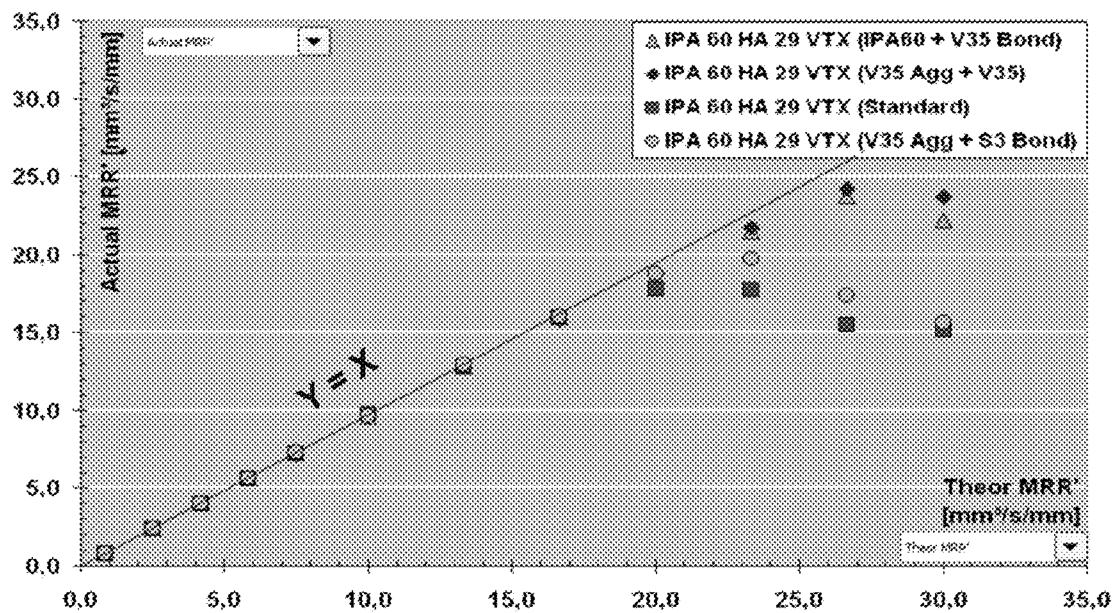
FIG. 7 includes a plot of actual material removal rate versus theoretical material removal rate for conventional bonded abrasive articles and an abrasive article according to an embodiment.

FIG. 7 includes a plot of actual material removal rate versus theoretical material removal rate for Samples S1, CS1, and CS2. As illustrated, Sample S1 demonstrates an actual material removal rate significantly above the actual material removal rate capabilities of the conventional samples CS1 and CS2.

Figure 8:
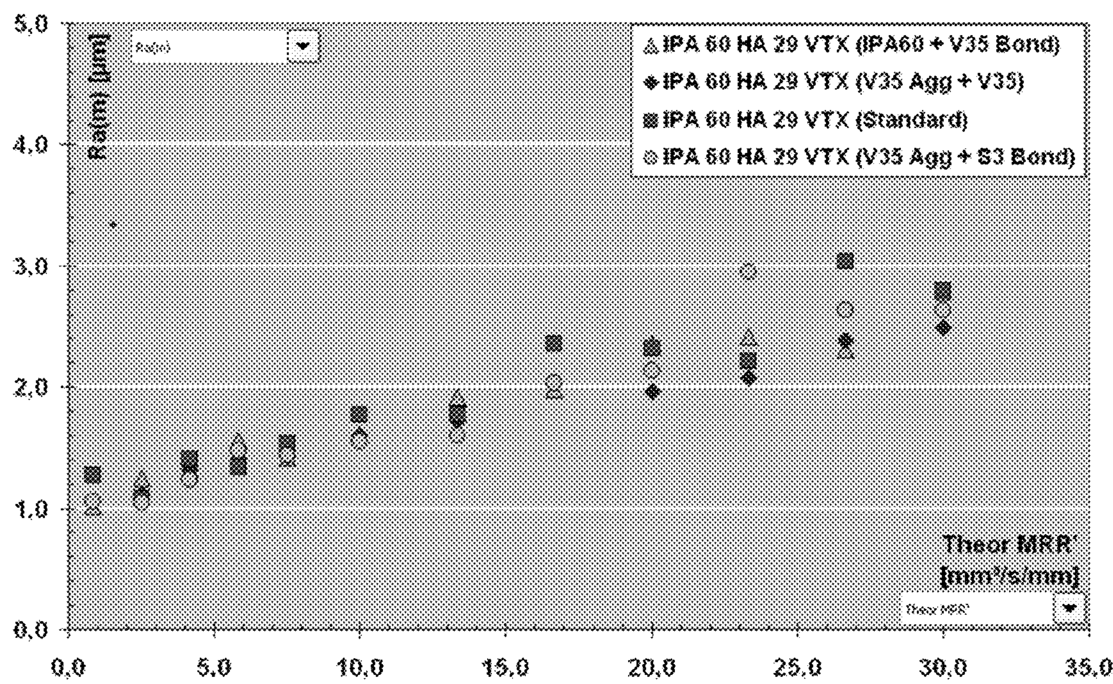
FIG. 8 includes a plot of surface roughness (Ra) versus material removal rate for conventional bonded abrasive articles and an abrasive article according to an embodiment.

FIG. 8 includes a plot of surface roughness (Ra) versus material removal rate for each of the samples. As illustrated, Sample S1 demonstrated equal or better capability for grinding the workpiece to a suitable surface roughness as compared to the conventional samples CS1 and CS2.

Example 2

Further comparative grinding studies were conducted to compare the high-material removal rate grinding capabilities of the bonded abrasive articles of the embodiments herein to conventional grinding bonded abrasive articles.

Five samples of bonded abrasive bodies are obtained. Samples S3, S4, and S5 are formed according to embodiments herein and have the structure of Sample S1 of Example 1 above.

Two conventional Samples CS3 and CS4 are obtained from Saint-Gobain Abrasives, Inc. Sample CS3 is commercially available as a Vortex Bonded Abrasive Wheel and is the same as Sample CS1 from Example 1.

Sample CS4 is commercially available as Quantum Creepfeed Product having a structure of approximately 40 vol % to 50 vol % porosity, a microcrystalline alumina abrasive particle content between 3 vol % and 15 vol %, and a vitreous bond content of between about 4 vol % to 7 vol %. The composition of the bond material is provided in Table 5 below. Sample CS4 has 1-5 vol % bubble alumina material and no abrasive agglomerates.

TABLE 5

| Bond Composition of Conventional Sample CS4 | | | | | | | | | |
|---|---|---|---|---|---|---|---|---|---|
| SiO2 | Al2O3 | Fe2O3 | TiO2 | CaO | MgO | Na2O | K2O | Li2O | B2O3 |
| 50-60 | 10-17 | <1 | <1 | <1 | <1 | '5-10 | 1-12 | 1-5 | 10-15 |

Each of the samples is tested according to a similar UHMRR grinding test condition as detailed above in Example 1.

Figure 9:
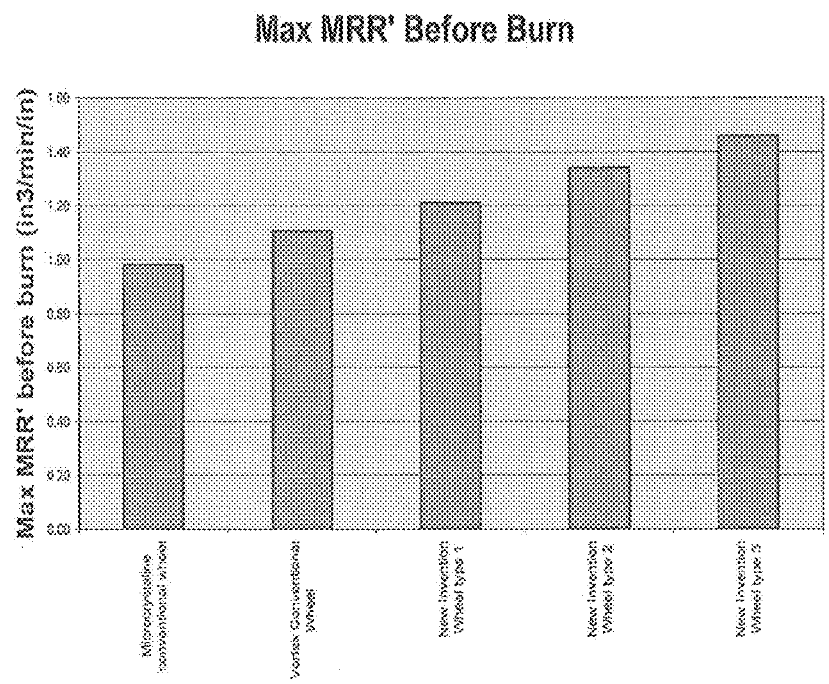
FIG. 9 includes a chart of maximum material removal rate ($in^3$/min/in) for conventional bonded abrasive articles and abrasives article according to an embodiment.

FIG. 9 is a chart of maximum material removal rate ($in^3/min/in$) for each of the samples before the workpiece exhibits burn. As illustrated, CS4 and CS3 demonstrate significantly lower maximum material removal rates before damaging the workpiece. In fact, Sample S3 demonstrates a 10% improvement in maximum material removal rate over Sample CS3 and better than a 20% improvement in maximum material removal rate as compared to Sample CS4. Moreover, Sample S4 demonstrates nearly a 20% improvement in maximum material removal rate over Sample CS3 and better than a 35% improvement in maximum material removal rate as compared to Sample CS4. Sample S5 demonstrates an improvement in maximum material removal rate of greater than 30% over Sample CS3 and better than a 40% improvement in maximum material removal rate as compared to Sample CS4. Samples S3-S5 demonstrate improved operation at ultra high material removal rates as compared to the conventional samples (CS3 and CS4).

Figure 10:
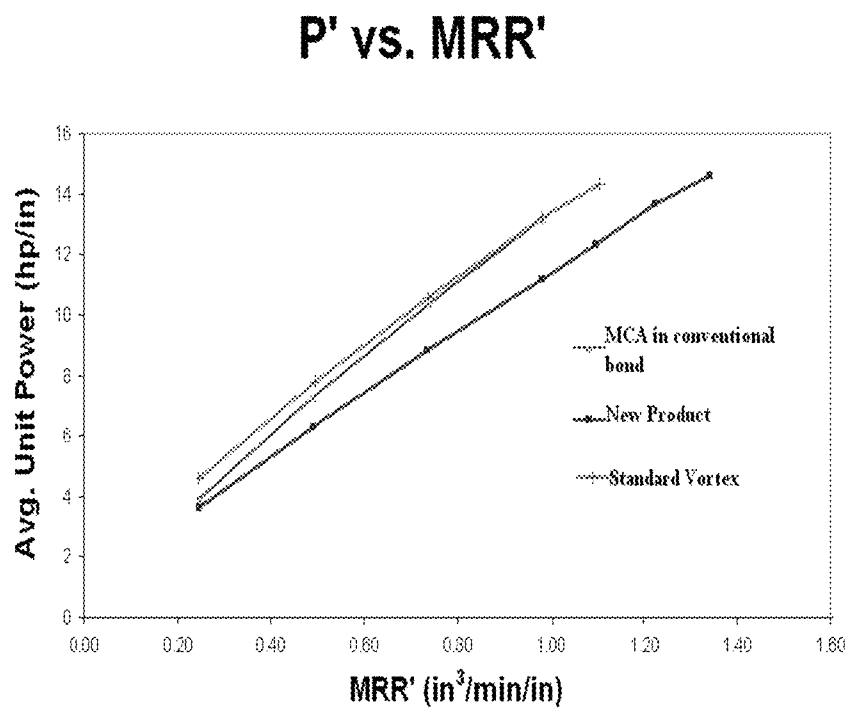
FIG. 10 includes a plot of average unit power (Hp/in) versus material removal rate (in3/min/in) for conventional bonded abrasive articles and abrasive articles according to an embodiment.

FIG. 10 includes a plot of average unit power (Hp/in) versus material removal rate (in3/min/in) for each of the samples. As clearly illustrated, the Samples S3, S4, and S5 demonstrate lower power drawn at each of the material removal rates as compared to the samples CS3 and CS4. Furthermore, the Samples S3-S5 have a lower specific grinding energy, which is a measure of the slope of the lines of the respective plots, as compared to Samples CS3 and CS4. Moreover, as again evidenced, the Samples S3-S5 were capable of grinding at higher material removal rates before ceasing the grinding operation as compared to CS3 and CS4.

| | |
|---|---|
| Machine: Blohm | Material: 4340.000 |
| Coolant type: E812 | Hardness: 40 RC |
| Wheel Speed[sfpm]: 5000 | |
| Table Speed[ipm]: Var. | |
| Dress Tool: Dia, Roll | |
| Dresser Speed ratio: 0.8 | |
| Dress Comp[in/rev]: 40.000000 | |
| Dress speed[in/min]: | |
| Pregrind: 0.0100 | |

The foregoing embodiments are directed to abrasive products, and particularly bonded abrasive products, which represent a departure from the state-of-the-art. The bonded abrasive products of the embodiments herein utilize a combination of features that facilitate improved grinding performance. As described in the present application, the bonded abrasive bodies of the embodiments herein utilize a combination of non-limiting features including a particular amount and type of abrasive particular material, including abrasive agglomerates and unagglomerated abrasives, particular amount and type of bond material, type of binder material, type of agglomerates having certain materials and characteristics, certain pore formers, and a particular amount of porosity. In addition to the discovery that such products could be formed effectively, despite being outside of the known realm of conventional abrasive products in terms of their grade and structure, it was also discovered that such products demonstrated improved grinding performance. Notably, it was discovered that the bonded abrasives of the present embodiments are capable of conducting efficient grinding operations at ultra high material removal rates. In fact, quite surprisingly, the bonded abrasive bodies of the embodiments herein demonstrated a capability of grinding at ultra high material removal rates, while also demonstrating improved wear, grinding energy, and suitable surface finish as compared to state-of-the-art high speed grinding wheels.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An abrasive article comprising:

a bonded abrasive body including:

a bond material comprising an inorganic material;

abrasive agglomerates contained in the bond material, wherein the abrasive agglomerates comprise at least about 70 vol % and not greater than about 90 vol % abrasive particles for a total volume of the abrasive agglomerates;

a porosity of at least about 52 vol % and not greater than about 58 vol % of a total volume of the bonded abrasive body; and the bonded abrasive body having a wear rate of not greater than about 90% during an ultra-high material removal rate (UHMRR) grinding operation.

2. The abrasive article of claim 1, wherein the abrasive agglomerates comprise an amount of abrasive particles of at least about 70 vol % and not greater than about 80 vol % for the total volume of the abrasive agglomerate.

3. The abrasive article of claim 1, wherein the abrasive particles of the abrasive agglomerates comprise microcrystalline alumina having an average grain size of not greater than about 1 micron.

4. The abrasive article of claim 1, wherein the abrasive agglomerates comprise abrasive particles contained in a binder, and wherein the binder comprises an oxide-based vitrified material.

5. The abrasive article of claim 4, wherein the abrasive agglomerates comprise an amount of binder of at least about 1 vol % and not greater than about 4 vol % for a total volume of the abrasive agglomerate.

6. The abrasive article of claim 1, wherein the body further comprises unagglomerated abrasive particles separate from the abrasive agglomerates contained within the bond material, and wherein the unagglomerated abrasive particles comprise microcrystalline alumina.

7. The abrasive article of claim 1, wherein the body comprises an abrasive particulate ratio ($AP_p$:$AP_{agg}$) within a range between 0.85 and about 1.18, wherein $AP_p$ represents an amount (vol %) of abrasive particles present in the body and $AP_{agg}$ represents an amount (vol %) of abrasive agglomerates present in the body.

8. The abrasive article of claim 1, wherein the abrasive agglomerates comprise an amount of binder of at least about 1 vol % and not greater than about 4 vol % for the total volume of the abrasive agglomerates.

9. The abrasive article of claim 1, wherein the abrasive agglomerates comprise an amount of porosity of at least about 6 vol % and not greater than about 29 vol % for the total volume of the abrasive agglomerates.

10. The abrasive article of claim 1, wherein the bond material includes silica ($SiO_2$) in an amount of at least about 48 wt % and not greater than about 52 wt %, alumina ($Al_2O_3$) in an amount of at least 15 wt % and not greater than about 20 wt %, alkali oxide compounds ($R_2O$) in an amount of at least about 9 wt % and not greater than about 20 wt %, and boron oxide ($B_2O_3$) in an amount of at least about 10 wt % and not greater than about 17 wt %.

11. An abrasive article comprising:

a bonded abrasive body including:

a vitreous bond material comprising an inorganic material;

abrasive particulate material contained in the vitreous bond material, the abrasive particulate material including abrasive agglomerates and unagglomerated abrasive particles, wherein the abrasive agglomerates include at least about 70 vol % and not greater than about 90 vol % abrasive particles of alumina for a total volume of the abrasive agglomerates;

a porosity of at least about 52 vol % and not greater than about 58 vol % of a total volume of the bonded abrasive body; and the bonded abrasive body having a maximum material removal rate of at least about 1.6 in.$^3$/min./in. [17.3 mm$^3$/s/mm] during an ultra-high material removal rate (UHMRR) grinding operation.

12. The abrasive article of claim 11, wherein the abrasive agglomerates comprise abrasive particles contained in a binder, and wherein the abrasive particles of the abrasive agglomerates consist essentially of microcrystalline alumina.

13. The abrasive article of claim 12, wherein the abrasive agglomerates comprise an amount of binder of at least about 1 vol % and not greater than about 4 vol % for the total volume of the abrasive agglomerate.

14. The abrasive article of claim 11, wherein the body comprises an abrasive particulate ratio ($AP_p$:$AP_{agg}$) within a range between 0.85 and about 1.18, wherein $AP_p$ represents an amount (vol %) of unagglomerated abrasive particles present in the body and $AP_{agg}$ represents an amount (vol %) of abrasive agglomerates present in the body.

15. An abrasive article comprising:

a bonded abrasive body including:

a vitreous bond material in an amount of at least 3 vol % and not greater than 8 vol % for a total volume of the body;

abrasive particulate material contained in the vitreous bond material, the abrasive particulate material including abrasive agglomerates and unagglomerated abrasive particles, wherein the abrasive agglomerates include at least about 70 vol % and not greater than about 90 vol % of abrasive particles of alumina for the total volume of the abrasive agglomerates, wherein the body comprises a content of abrasive particulate material of at least 34 vol % and not greater than 40 vol %; and a porosity of at least about 52 vol % and not greater than about 58 vol % of the total volume of the bonded abrasive body.

16. The abrasive article of claim 15, wherein the abrasive agglomerates comprise abrasive particles contained in a binder, wherein the abrasive particles of the abrasive agglomerates consist essentially of microcrystalline alumina.

17. The abrasive article of claim 16, wherein the abrasive agglomerates comprise an amount of abrasive particles of at least about 70 vol % and not greater than about 80 vol % for the total volume of the abrasive agglomerate.

18. The abrasive article of claim 15, wherein the abrasive agglomerates comprise abrasive particles contained in a binder and wherein the binder comprises an oxide-based vitrified material.

19. The abrasive article of claim 18, wherein the abrasive agglomerates comprise an amount of binder of at least about 1 vol % and not greater than about 4 vol % for the total volume of the abrasive agglomerate.

20. The abrasive article of claim 15, wherein the body comprises not greater than about 5 vol % of unagglomerated abrasive particles and at least 34 vol % and not greater than 40 vol % of agglomerated abrasive particles.

21. The abrasive article of claim 15, wherein a portion of the porosity is interconnected porosity, and wherein at least about 5% of the total volume of porosity is interconnected porosity.

22. The abrasive article of claim 15, wherein the bond material includes silica ($SiO_2$) in an amount of at least about 48 wt % and not greater than about 52 wt %, alumina ($Al_2O_3$) in an amount of at least 15 wt % and not greater than about 20 wt %, alkali oxide compounds ($R_2O$) in an amount of at least about 9 wt % and not greater than about 20 wt %, and boron oxide ($B_2O_3$) in an amount of at least about 10 wt % and not greater than about 17 wt %.

* * * * *